July 1, 1969   T. N. CANNING   3,452,872

SHOCK-LAYER RADIATION MEASUREMENT

Filed April 13, 1965

INVENTOR.
THOMAS N. CANNING
BY
ATTORNEYS

United States Patent Office 3,452,872
Patented July 1, 1969

3,452,872
SHOCK-LAYER RADIATION MEASUREMENT
Thomas N. Canning, Sunnyvale, Calif., assignor to the United States of America as represented by the Administrator of the National Aeronautics and Space Administration
Filed Apr. 13, 1965, Ser. No. 447,930
Int. Cl. G01j 1/44
U.S. Cl. 250—217     5 Claims

ABSTRACT OF THE DISCLOSURE

A method and apparatus for determining the spatial distribution of shock layer radiation about objects moving at high velocities. An image of the shock layer radiation is formed at a plane of dissection. The image is sequentially dissected, the image segments are converted to signals proportional to light intensity, and the signals produce a visual display of the shock layer radiation profile.

---

The invention described herein may be manufactured and used for or by the Government of the United States of America for governmental purposes without the payment of any royalties thereon or therefor.

The present invention is directed in general to method and means for determining the spatial distribution of shock layer radiation about objects moving at high velocities.

It is known that objects, such as projectiles, or the like, propelled at high speed through the atmosphere produce hot gas layers in advance of the object. For many purposes it is highly advantageous and, in fact, necessary to determine the exact configuration of the radiation from these layers. This knowledge is applicable in the design of efficient shapes for high-velocity projectiles, space vehicles, and the like.

An object of any physical configuration moving at sufficient velocity through the atmosphere will establish a shock layer in advance of the object, and the present invention is adapted to determine the spatial distribution of the radiation from this layer by viewing and displaying the variation in intensity of radiation from segmented portions thereof. Although means such as high-speed photography have been employed to obtain information about shock layers surrounding projectiles such as rifle bullets, these means are wholly inadequate for direct determination of radiative distribution from shock layers. In the study of shock layers about objects of varying configurations traveling at hypersonic speed, it has hitherto been necessary to rely upon theoretical determinations of the distribution of radiation from the hot gases in the shock layer about the body. The present invention provides for directly determining this information.

It is an object of the present invention to provide method and means for segmentally dissecting a shock layer image and producing a display of radiation intensity variation across each segment.

It is another object of the present invention to provide method and means for optically determining the spatial distribution of shock layer radiation from an object traveling at hypersonic speeds.

It is a further object of the present invention to provide an optical system for viewing substantially head-on the radiation of a shock layer about a high-velocity object while optically segmenting the image thereof and scanning each image segment to produce a measurement of radiation intensity across each such segment.

Various other objects and advantages of the present invention will become apparent to those skilled in the art from the following description of a single, preferred embodiment of the invention and preferred enumerated steps of the method hereof. It is not intended to limit the present invention by the terms of the following description or the details of the accompanying drawings, but instead, reference is made to the appended claims for a precise delineation of the true scope of this invention.

Reference is made to the accompanying drawing illustrating a single, preferred embodiment of the invention, and wherein:

FIGURE 1 is a schematic representation of the entire system applied to an aeroballistic range, or the like;

Considering first the method of the present invention, it is herein provided that light radiated from the shock layer preceding a high-velocity object shall be viewed from a fixed position as close as possible to the line of object traverse, and ahead of the object. More specifically, the invention provides for reflecting this light from a position closely spaced laterally of the path of the object to form an image focused at a dissecting plane. As the object moves toward the location of light viewing and reflection, the image will be moved across the dissecting plane so that the image is actually scanned. The nature of the optics is made such that the depth of field is large so that the image is well focused during the entire scan. The radiation image at the dissecting plane is transversely segmented to dissect the image. As the image moves across the plane, each of the segments thereof contains a variation of light intensity corresponding to the intensity profile of the radiation from that segment of the shock layer preceding the object.

The scanned segmented images are optically transmitted from the dissecting plane to separately energize means producing electrical signals having amplitudes proportional to the intensity of light received. These electrical signals are separately employed to produce a plurality of separate displays defining the light intensity variation in the scan of each separate image segment. More specifically, the display is preferably accomplished by means of oscilloscopes having a horizontal sweep triggered at passage of the high-velocity object through a light beam, or the like, and vertical deflection means energized by the electrical signals produced from the light transmitted from a scan of each individual image segment.

Figure 1:
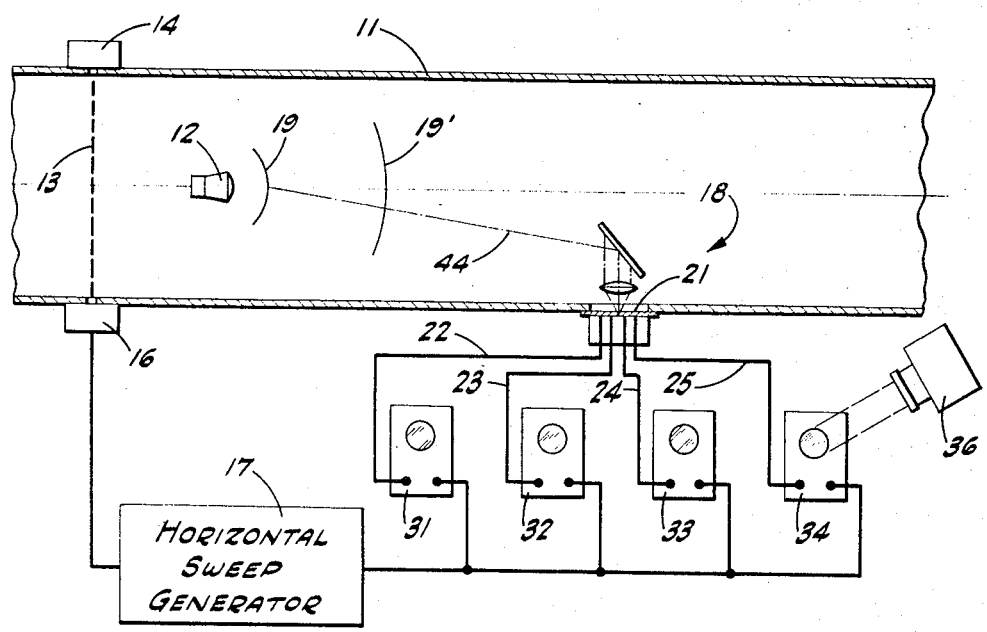

Considering now a preferred embodiment of the present invention as regards the apparatus thereof, reference is made to FIGURE 1, wherein there is schematically illustrated a portion of a ballistic range 11 along which an object 12 is adapted to be propelled at a very high velocity. This object 12 may have any desired physical configuration, and in accordance with conventional testing practices, may be projected at a high velocity longitudinally of the ballistic range 11 by a gas gun, or the like. As the object 12 passes a transverse plane 13 of the range, provision may be made for triggering the apparatus of the invention. This is accomplished, for example, by the provision of a source 14 of collimated light in a beam transversely across the range 11 in the plane 13, so as to be received by photoresponsive means 16. As the object 12 passes along the range through the plane 13, it will disrupt the light beam from 14 and, consequently, change the conditions at light-responsive means 16 so as to produce an output signal applicable to trigger a horizontal sweep generator 17. Traverse of the object 12 at a high velocity axially of the ballistic range causes the object to come into view of an optical system 18 which focuses light from the shock layer 19 upon an image dissecting plate 21 viewing the interior of the ballistic range. This image dissector plate 21 includes light transmission means and transducing means producing electrical signals in conductors 22, 23, 24 and 25 extending therefrom. Each of these conductors carries electrical signals representative of the intensity of light appearing at horizontally-segmented portions of the image focused upon the dissection plate 21.

Display of the information detected by the present invention is accomplished at a plurality of oscilloscopes 31, 32, 33 and 34. The conductors 22 to 25 are individually connected to the vertical deflection terminals of oscilloscopes 31 to 34, respectively, and the horizontal sweep generator 17 is connected to each of the horizontal deflection terminals of these same oscilloscopes. There is consequently produced at each of the oscilloscopes a trace of the intensity of light radiated from individual segments of the shock layer across same as the radiation image is swept across the dissection plane or plate 21. Provision may also be made for permanently recording the intensity profile of radiation across each segment of the shock layer image. This can be readily accomplished by the provision of one or more cameras, or the like 36, recording traces formed upon the screen of oscilloscope 34 and the screens of the other oscilloscopes. In this manner the information produced by the present invention is recorded and retained for future consideration and study as required.

Figure 2:
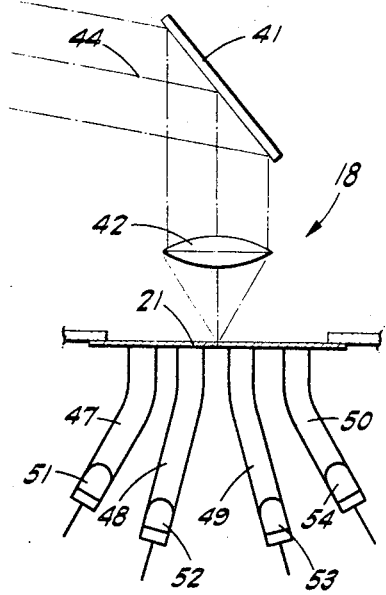
FIGURE 2 is an elevational view of an optical system operable to focus and scan a radiation image.
Figure 3:
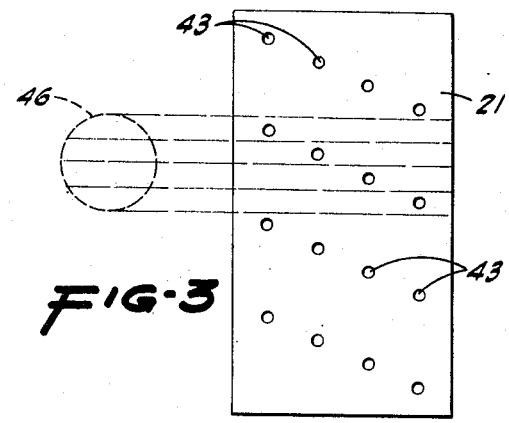
FIGURE 3 is a frontal view of an optical image dissector with an indication of image segments viewed thereby.

Considering further the optical system of the present invention, reference is made to FIGURES 2 and 3 of the drawings, wherein there are illustrated the optical system and the image dissection, respectively. As shown in FIGURE 2, a mirror 41 is disposed at an angle of substantially 45° to the direction of traverse of the object 12 and closely spaced from the line of travel of such object, as generally indicated in FIGURE 1. This reflective surface or mirror 41 serves to re-direct light emitted from the shock layer preceding the object, downward or laterally of the direction of travel of the object, through a lens 42 into focus upon the image dissecting plane or plate 21. Further with regard to image dissection, in accordance with the present invention, the plate defining the plane 21 is either inserted in a side wall of the ballistic range or affixed to the exterior of the ballistic range viewing the interior thereof. This plate 21 is formed with a plurality of vertical columns of minute apertures 43. The apertures of each column are staggered with respect to the apertures of all other columns so that no two apertures lie in the same horizontal plane. The spacing between apertures in any single column is such that only one segment of the image can be viewed by that column. This is generally illustrated in FIGURE 3. As an example of an operative embodiment of the present invention, there may be provided four vertical columns of apertures, as shown in FIGURE 3, with about five apertures in each column, so as to provide a total of twenty apertures in the plate 21. In order to more fully understand the present invention, there is schematically illustrated in FIGURE 3 an image 46 of the shock layer radiation 19 preceding the object 12 and focused upon the plate 21 by the optical system 18. During passage of the object 12 at a high velocity axially through the ballistic range 11, substantially no vertical or lateral deflection of the object occurs and, consequently, the object may be considered as passing axially through the ballistic range so that it follows a fixed line of traverse past the optical system 18. Inasmuch as the object 12 may thus be considered to maintain a fixed altitude with respect to the reflective mirror 41 of the optical system, passage of the object through the ballistic range causes the radiation image 46 thereof to be swept across the dissecting plate 21. This may be more fully understood from a further consideration of FIGURE 1, wherein the shock layer is illustrated at 19 and 19' after the object has moved along the ballistic range 11 toward the optical system 18. The dashed line 44 in FIGURE 1 extending from the center of the shock layer 19 to the center of the mirror 41 of the optical system will be seen to extend from a lower extremity of the shock layer 19' after the object 12 is moved along the ballistic range. Consequently, it will be appreciated that an image of the shock layer radiation is actually swept across the detection plate 21.

FIGURE 3 schematically illustrates the relationship of an image 46 to the dissection plate 21 and the horizontal dashed lines extending from the image 46 across the plate indicate the lateral movement of the image with respect to the plate. It will be seen that only single plate apertures in separate vertical columns define separate horizontal segments of the image, and consequently light from each such horizontal segment impinges upon only a single light aperture 43 of the plate. A plurality of additional apertures 43 are formed beyond that required for the illustrated image 46 in order to permit study of images traveling somewhat above or below the range centerline. However, it is to be appreciated that in all instances a single light aperture in each column receives all light across a horizontal segment of an image focused upon the plate, and only one such aperture in each column receives light from the image.

Each of the columns of light apertures 43 is provided with a single light path extending from the back of the plate 21 to a photomultiplier for producing electrical signals proportional to incidental light at the front of the plate. More specifically, in accordance with the illustrated embodiment, there are provided four, separate light pipes 47, 48, 49 and 50, physically engaging the rear surface of the dissecting plate 21 and each having all apertures in a single vertical row through the plate communicating with the front surface of the light pipe. As regards light piping, the present invention employs conventional light transmission media such as plastic material having a reflective coating on the exterior surface thereof for maintaining within the light pipe substantially all light incident to the input end thereof.

Figure 4:
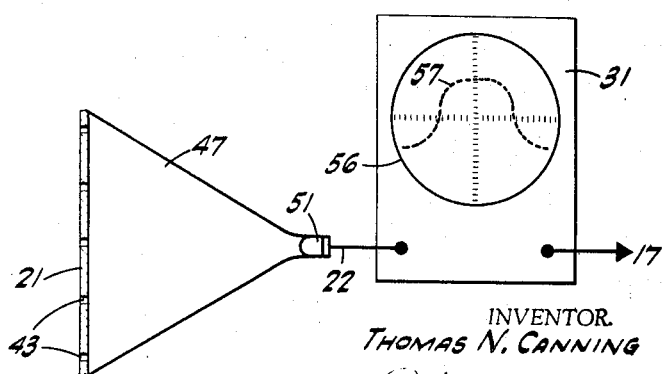
FIGURE 4 is a representation of a display of radiation intensity variation across one segment of a radiation image.

FIGURE 4 of the drawing illustrates in side elevation an individual light pipe 47 connected at an enlarged front end thereof to the rear surface of the dissecting plate 21 defining the dissecting plane of the present invention. The individual openings 43 through the plate 21 are indicated, and it is again noted that vertical displacement of the path of object 12 may actually cause the shock layer image to be focused upon various areas of the plate 21. As will be seen from FIGURE 4, the light pipe 46 may taper from a relatively large vertical dimension at the front surface thereof, to a smaller rear dimension as, for example, in the form of a triangle, and photomultipliers 51, 52, 53 and 54 are provided at the small end of each of the light pipes. These photomultipliers may be quite conventional so as to produce electrical signals in amplified form proportional to incident light. Again as shown in FIGURE 4, the photomultiplier 51 viewing the light pipe 47 is connected through an output lead 22 to the vertical deflection terminal of the oscilloscope 31. The horizontal deflection terminal of this same oscilloscope is connected to the horizontal sweep generator 17 which is, as noted above, triggered to operate upon passage of the object 12 through the plane 13 transversely of the ballistic range. On the display screen 56 of this oscilloscope 31 there is traced the intensity profile of light emitted from an individual horizontal segment of the shock layer 19 preceding the high-velocity object 12. Such a trace is schematically illustrated at 57 of FIGURE 4 indicating the experimental light intensity distribution across a horizontal segment of a shock layer preceding a blunt-nosed object traveling at hypersonic speed.

It will be appreciated from the foregoing that the present invention provides for the direct detection and measurement as well as display and recording of the intensity profile of the shock layer radiation preceding an object moving at very high velocities. From this intensity profile, it is possible to determine a number of characteristics of objects of various configurations traveling at hypersonic speeds, and the invention precludes the prior art dependency upon theoretical assumptions. Radiation intensity is herein directly measured and, consequently, the applicability of measurements hereof is greatly enhanced over that available from the prior art. The information determined by the present invention is of great importance in the design of various bodies adapted to be passed at hypersonic velocities through the atmosphere, and the present invention for the first time provides for a direct measurement of shock layer parameters to thereby facilitate the most advantageous design of objects adapted to travel through the atmosphere at hypersonic speeds.

What is claimed is:

1. A method of directly indicating the intensity profile of radiation from a shock layer preceding a high-speed object, comprising the steps of optically producing an image of radiation about the object from substantially the front of the object during travel thereof, horizontally dividing the image into small increments, optically transmitting said increments to a transducing location and there producing electrical signals proportional to light intensity, and producing a visual display of each image segment with a fixed time base as a shock layer intensity profile across each image segment.

2. A method of directly measuring the radiative emission from the hot gas in front of a high-speed object comprising the steps of optically viewing the image of radiation in front of the object from a fixed position adjacent the path of travel of the object and in front of the object whereby the image is optically scanned, dividing the viewed image into a plurality of contiguous segments with light intensity across each segment varying with the image scan, producing electrical signals proportional to instantaneous light intensity in each image segment, and displaying said signals against a fixed time base as a graph of radiation intensity across each image segment.

3. Apparatus for displaying the intensity of radiation from a shock layer ahead of an object moving at hypersonic velocity in an atmosphere, comprising an optical system including a reflector disposed substantially on the path of the object ahead of the object and focusing an image of the radiation upon a viewing plane whereby the image moves across the plane as the object approaches the reflector, a plate disposed in said plane with a plurality of apertures therethrough in staggered relation to each other so that movement of the image across the plate passes a separate image increment across one aperture in each column of apertures, a plurality of light pipes each extending behind a single column of apertures through said plate for transmitting light from separate image increments, a plurality of photomultipliers disposed with a separate one viewing the output of each of said light pipes and producing electrical signals proportional to incident light, a plurality of display means separately energized by electrical signals from separate photomultipliers for producing a visual display of the variation of radiation intensity across the image at each increment thereof, and recording means directed at said visual displays for recording same.

4. Apparatus as set forth in claim 3, further defined by said display means comprising separate oscilloscopes with each having vertical deflection means energized from a single photomultiplier, a horizontal sweep generator connected to energize horizontal deflection means of all of the oscilloscopes, and means triggering said horizontal sweep generator upon passage of a high-speed test object through a plane of predetermined location ahead of the reflector of said optical system.

5. Apparatus for directly indicating the variation of radiation intensity of shock layers preceding objects moving at hypersonic velocities comprising a mirror disposed immediately adjacent an object path and ahead of the object to reflect an image of shock layer radiation away from the object and onto a dissecting plate whereby the image moves across the plate as the object approaches the mirror, said plate having a plurality of columns of minute apertures therethrough with the columns aligned perpendicularly to the direction of image movement, the apertures in separate columns being staggered with respect to each other so that movement of the image across the plate exposes single apertures to separate segments of the image, a plurality of light pipes having elongated front faces engaging the plate with each front face in line with a single column of apertures and each having small rear faces laterally separated from each other, a plurality of photomultipliers disposed with one communicating with the rear face of each light pipe to produce electrical signals proportional to instantaneous light intensity of each image segment, a plurality of oscilloscopes having vertical deflection means individually energized by separate photomultipliers and horizontal deflection means, and a horizontal sweep generator having the output connected to the horizontal deflection means of said oscilloscopes and triggered to produce an output as a high-speed object approaches said mirror to produce at each oscilloscope a visual trace of radiation intensity across a segment of the shock layer image.

References Cited

UNITED STATES PATENTS

| | | | |
|---|---|---|---|
| 2,925,007 | 2/1960 | Silver | 250—218 X |
| 3,182,499 | 5/1965 | Moses | 250—83.3 X |
| 3,253,126 | 5/1966 | Baughman | 250—83.3 X |

WALTER STOLWEIN, *Primary Examiner.*

U.S. Cl. X.R.

73—147; 250—227